United States Patent Office 2,825,678
Patented Mar. 4, 1958

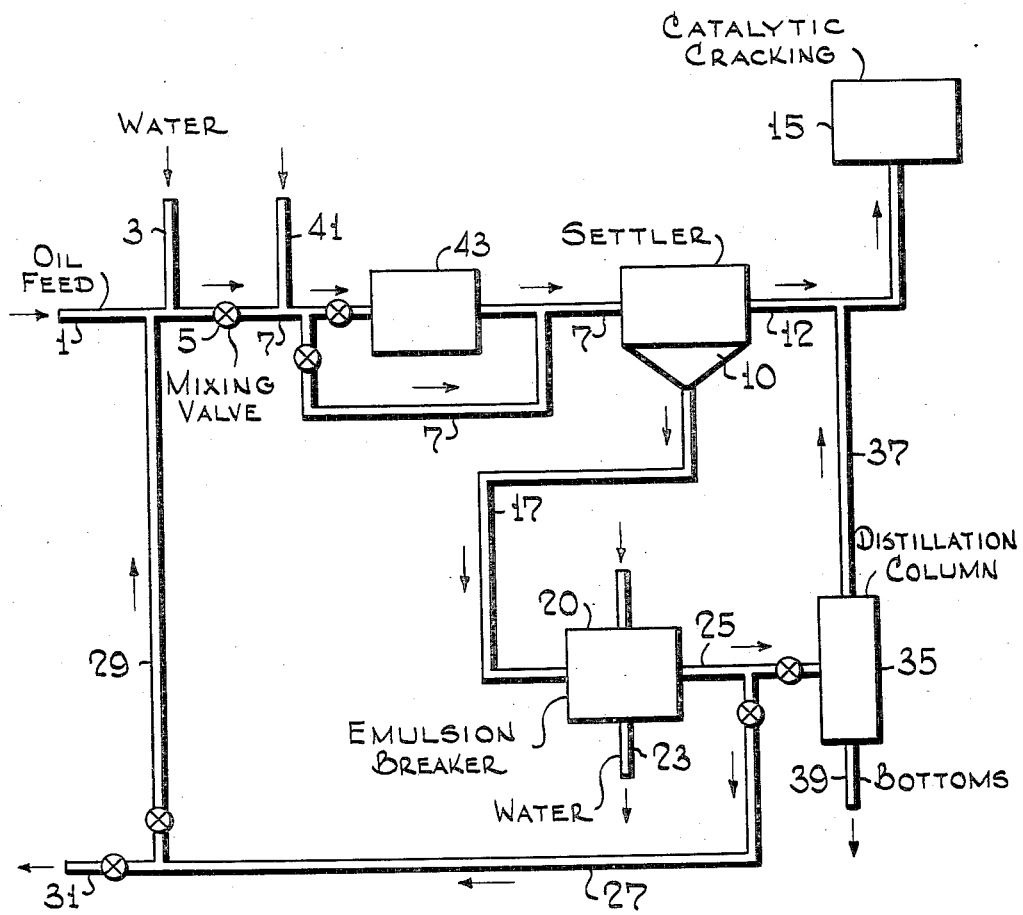

2,825,678

PURIFICATION OF HYDROCARBON OILS

Charles E. Jahnig, Red Bank, and Arnold F. Kaulakis, Chatham, N. J., assignors to Esso Research and Engineering Company, a corporation of Delaware Application September 25, 1951, Serial No. 248,214

4 Claims. (Cl. 196—52)

The present invention relates to the purification of hydrocarbon oils. More specifically, the invention is concerned with the removal of oil- and water-insoluble contaminants from hydrocarbon oils, particularly hydrocarbon oils used as feed stocks for catalytic cracking processes and, in this form, the invention pertains to the catalytic cracking of hydrocarbon oils from which oil- and water-insoluble contaminants have been removed. In its broadest aspect, the invention provides for intimately mixing contaminated oils with water to form a water-in-oil emulsion, settle or otherwise concentrate the emulsion to form a minor emulsion phase and a major free oil phase, and separating the emulsion phase formed from the free oil phase.

Hydrocarbon oils, such as crude oil and its distillation and conversion products, contain various types of contaminants detrimentally affecting refining processes, product handling and product quality. For example, crude oil contains various water soluble inorganic salts, particularly sodium chloride. Crude oils and distillate oils also contain metallic elements, particularly in the form of particles originating in the crude or resulting from the corrosion of metal lines and storage tanks in the presence of the oils. In some cases, oil soluble metallic compounds may be present. One type of contaminant present in most oils handled in refineries consists of particles of iron and iron compounds, such as various oxides and sulfides formed by the corrosion or erosion of lines and tanks. Also, the oil frequently contains certain high-molecular weight hydrocarbonaceous materials, such as certain pitches and asphalts, which are insoluble in water and may be insoluble in oil at atmospheric temperature.

In catalytic processes, such as catalytic cracking, the presence of minute amounts of metallic compounds or particles in the feed presents a serious problem, since these contaminants accumulate on the catalyst and degrade it. The loss in catalyst selectivity resulting from iron in the oil feed in a concentration of only 1.0 pound $Fe_2O_3$ per 1,000 barrels of oil will result in a loss in product values of $500,000.00 per year, for a 40,000 barrels per day cracking unit. Although this is a very large debit, it amounts to only a few cents per barrel of feed. Hence, the potential credit obtainable by iron removal is insufficient to justify a complicated or expensive process for removing contaminants from the oil feed. Thus, even so simple a process as redistilling the feed would entail an operating cost equal to several times the credit for removing the contaminants and would be uneconomical.

The removal of water-soluble contaminants may be accomplished by conventional water-washing. This process involves emulsifying the oil with a minor proportion of water, breaking the emulsion by electrical precipitation or similar means to form separate layers of oil and water and removing the contaminants together with the water in which they are dissolved. Metallo-organic compounds may be decomposed at elevated temperatures to form oil- and water-insoluble precipitates to be separated by filtration.

Neither of these methods is practical for the removal of the type of contaminant particles mentioned above which are insoluble in water and, therefore, are not amenable to removal by conventional methods of water washing. Filtration appears theoretically feasible. However, it has been found that large proportions of these contaminants, such as iron, its oxides and sulfides, as well as traces of heavy pitches and asphalts and carbon particles are present in the form of extremely small particles of less than 1/10 micron in diameter and even approaching colloidal dimensions. Extremely dense filters are, therefore, required which involve pressure drops and plugging difficulties so excessive that conventional filtration has never appeared attractive in commercial operation. Distillation, while theoretically feasible, is uneconomical commercially because of the large amounts of oil involved. On the other hand, the removal of these contaminants is highly desirable, particularly when the oils are to be used as feed stocks for catalytic cracking operations, the catalysts of which are rapidly deactivated by these contaminants.

The present invention overcomes the aforementioned difficulties and affords various additional advantages as will become apparent from the description hereinafter in which reference will be made to the accompanying drawing, the single figure of which is a flow diagram illustrating a preferred embodiment of the invention.

It has now been found that finely divided contaminants of the type of iron, its oxides and sulfides, other metal compounds, carbon, siliceous materials and heavy hydrocarbonaceous materials, which are insoluble in oil and water become concentrated in the emulsion phase when the contaminated oil is intimately mixed and emulsified with water. There is evidence to the effect that these contaminants are present in the form of small particles which tend to accumulate at the interface between oil and water phases in the emulsion produced. However, when the emulsion is broken the contaminants, rather than staying in the water layer formed, return to the oil phase because they are wetted more readily by oil than by water. On the basis of these discoveries, this invention discloses a modified water-washing procedure which permits the production of clear oil in a relatively simple manner.

In accordance with the present invention, the contaminated oil is intimately mixed with water to produce an emulsion followed by settling or otherwise concentrating the emulsion to form a minor emulsion phase and a major free oil phase. The emulsion phase is separated unbroken from the free oil phase which is substantially free of contaminants. The separated emulsion contains the contaminants and a relatively small proportion of the original oil and may now be broken by conventional means. The oil which is recovered from this emulsion and which contains a portion of the contaminants may be returned to the contaminated oil charge for retreatment. However, it is a distinct advantage of the present invention that the oil separated by breaking the emulsion represents only a very minor proportion of the total oil fed, say about 2 to 10% thereof, so that any suitable conventional method, such as filtration, distillation, etc., may be used for its purification on a commercial scale. These processing schemes can now be used economically, since the contaminants have been concentrated into a stream which is small relative to the total oil feed.

When carrying out the process of the invention, the oil and water are intimately mixed by means of a mixing valve, such as a globe valve or a valve of the type used with automatic flow control instruments, adapted to convert the water into a water-in-oil emulsion. The water may be used in amounts of up to 50% by volume of oil, or more, depending on the type and amount of impurities to be removed. For example, about 5–10 vol. percent of water is generally sufficient for the removal of iron, its oxides and sulfides from catalytic cracking feed stocks of the gas-oil boiling range.

Temperature and pressure of the mixing stage depend on the boiling range of the feed. Quite generally, the temperature should be the higher, within the approximate range of 100°–500° F., the higher the boiling range or viscosity of the oil. For cracking feed stocks of the gas oil range, mixing temperatures of about 150°–350° F. are preferred. The pressure should be high enough to maintain the water in the liquid state at the temperatures employed. A pressure range of from atmospheric to about 300 p. s. i. g. is generally suitable for this purpose and to overcome the pressure drop in the subsequent feeding system of the process in which the decontaminated oil is to be used.

Settling of the emulsion to separate the emulsion phase from the clean oil may be accomplished by simple gravity settling for periods up to about one to four days and on the average about 20 to 65 hours. In some cases, it may be desirable to facilitate this separation by adding emulsion breaking agents, such as commercially available demulsifiers of the petroleum sulfonate type, or by filtering, centrifuging, applying electrical precipitation, etc. However, care must be taken to apply these auxiliary means in a manner mild enough so that the impurities will not be redispersed into the clean oil layer.

The main body of clear oil is substantially ash free. It may be sent to catalytic refining processes, such as catalytic cracking, without any further decontaminating treatment, such as filtering, distillation, etc.

The emulsion layer amounts to only about 5 to 20 vol. percent of the total oil charge and its oil content is only about 2–10 vol. percent of the total oil charge after separation from the clear oil layer. This emulsion may be broken in any conventional manner, such as by long time gravity settling for, say, about 1–30 days, including treatment with caustic or other chemical demulsifiers, electrical precipitation, etc. The emulsion may also be directly subjected to distillation or filtration or any combination of these means to separate the oil from the water and/or the contaminants. These types of operation are commercially practical in combination with the process of the invention because of the greatly reduced volume of the stream to be processed and because the contaminants cannot reenter the main body of the clear oil upon breaking of the emulsion.

The 2–10 volume percent of oil recovered from the emulsion may contain about 50–60% of the water-insoluble contaminants of the total oil charge. This amount of liquid is small enough to make purification by distillation and/or filtration commercially practical. Any desired proportion of this oil may be recycled to the water washing stage of the invention for further treatment.

When operating in accordance with the invention, over 90% of the iron content of the oil charge may be removed without any appreciable loss of oil, compared to 30–40% for conventional deashing procedures of the water-washing type. The following specific example will bear out this fact.

*Example*

A batch of 9,000 milliliters of gas oil (about 25° API gravity and about 700° F. mid-boiling point) was emulsified with 1,000 milliliters of water by stirring vigorously for 6 hours and allowed to settle for 64 hours, both at 190° F. The clear oil, amounting to 96.8% of the charge, was decanted, leaving 1100 milliliters of emulsion which contained 286 milliliters of oil and 611 milliliters of water. No free water was obtained during the settling period. The low recovery of water reflects evaporation during the test. The emulsion was tan in appearance, and so viscous that it would scarcely flow.

The emulsion was placed in an electrical precipitator for 10 hours at 190° F. It was possible to resolve all but 70 milliliters of the emulsion into either clear water or an oil phase containing 1.6 volume percent water. The oil charge, the washed oil, and the oil and water obtained from the emulsion were tested for ash content. These data are summarized below:

|  | Total Ash | $Fe_2O_3$ |
|---|---|---|
| Ash Concentrations, Pounds per 1,000 Barrels: |  |  |
| Inlet Oil | 4.61 | 0.96 |
| Washed Oil | 0.88 | 0.33 |
| Oil From Emulsion | 46.6 | 14.81 |
| Water From Emulsion | 36.4 | 5.65 |
| Inlet Water | 0.70 | 0.033 |
| Ash Removed From Oil, Weight Percent: |  |  |
| Contained in Water | 63 | 45 |
| Contained in Oil Removed From Emulsion | 37 | 55 |
| Ash Removal From Oil, Weight Percent (Based on Oil Concentrations) | 81 | 97 |

It will be seen from the above data that about 97% of the iron in the feed oil is removed with the emulsion phase. It is also of interest to note that about 55% of the iron content of the original oil is found in the oil recovered from the emulsion and only about 45% is found in the water. This proves that breaking of the emulsion in the presence of the cleaned or clarified oil results in an inefficient operation.

The objects and general nature of the invention having been set forth, a specific embodiment thereof will now be described with reference to the accompanying drawing.

Referring now to the drawing, the system illustrated therein essentially comprises a mixing device, such as a mixing valve 5, a settler 10, an oil beneficiation plant, such as catalytic cracking equipment 15, and an emulsion breaker 20. The functions and coaction of the elements will be explained using the removal of contaminating water- and oil-insoluble iron compounds from a catalytic cracking feed stock of the gas oil boiling range. It should be understood, however, that the system illustrated in the drawing may be used for the removal of the same or other water- and oil-insoluble contaminants from the same or different oils in a substantially analogous manner.

In operation, a gas oil having a boiling range suitable for catalytic cracking, say of about 600° F. initial boiling point, is supplied to line 1 from storage or directly from a crude still (not shown). The oil feed may contain insoluble iron-containing contaminants of ultra fine particle size, amounting to about 0.2–2.0 pounds $Fe_2O_3$ per 1,000 barrels of oil. A stream of water amounting to about 2–15 volume percent on oil fed is added to line 1 via line 3 at a point upstream of mixing valve 5 arranged in line 1. The temperature of the oil feed and water should be so chosen that the mixture leaves valve 5 at a temperature of about 150°–300° F.

Mixing valve 5 may be of the type used for controlling pressure. These valves have a valve seat arrangement which forces the fluid through a tortuous path conductive to intimate mixing. At a pressure drop across the valve of, say, about 20–30 pounds per square inch a degree of mixing sufficient for emulsification is attained.

The liquid leaving mixing valve 5 through line 7 which consists of a substantialy homogeneous water-in-oil emulsion may be passed directly to settler 10 at a pressure of about atmospheric to 100 pounds per square inch gauge. Settler 10 may be a simple conventional gravity-settling tank of sufficient volume to allow for a substantially quiescent liquid residence time of about 5–100 hours at the prevailing oil feed rate. At these conditions, two liquid layers are formed in settler 10. The upper layer amounting to about 90–98 volume percent of the oil fed consists of feed oil substantially free of water and insoluble iron-type contaminants. The bottom layer consists of a water-in-oil emulsion containing substantially all the water added through line 3, about 2–10 volume percent of the oil fed through line 1 and substantially all the insoluble iron-type contaminants. In some cases, a third layer consisting of free water will form, and may be withdrawn.

Clean oil is withdrawn from the top layer of settler 10 and may be passed via line 12 directly to a catalytic cracking system schematically illustrated at 15. The bottom layer of settler 10 is withdrawn through line 17 and passed to a suitable emulsion breaking device 20 of conventional design. As previously indicated, this device may be a gravity settler of the type of settler 10, allowing for a settling time of several days which may be shortened by the addition of chemical demulsifiers, such as caustic or commercially available demulsifiers, in a manner well known in the art of treating emulsions. Electrical precipitation may likewise be used alone or in combination with gravity settling to break the emulsion in element 20. Also, centrifuging, filtration, distillation, coking or thermal cracking may be used.

A bottom layer of water containing about 30–70 percent of the iron removed from the feed oil is withdrawn from emulsion breaker 20 via line 23. The top layer consisting substantially of oil amounting to about 2–10% of the original oil feed and containing the remainder of the iron removed from the feed oil is withdrawn through line 25.

This oil or any desired portion thereof may be returned via lines 27 and 29 to oil feed line 1 to be retreated as described above. Any oil not so recycled may be passed via line 31 to the original crude still or to any suitable thermal conversion process, such as a thermal cracking or coking stage. However, owing to its relatively low quantity the oil flowing through line 25 may also be economically subjected to distillation in a conventional distillation column 35. Clean oil recovered overhead from column 35 may be combined via line 37 with the clean oil recovered from settler 10 and passed to catalytic cracking stage 15. Bottoms from column 35 may be withdrawn via line 39 to be further treated by thermal cracking, coking, etc.

Returning now to catalytic cracking stage 15, this system which is preferably of the fluid-type may be operated in any conventional manner as described in many prior publications and patents, of which U. S. Patent No. 2,472,723 may be here referred to by way of example. Briefly, this operation involves the use of finely divided catalysts, such as various activated claps, or composites of silica gel with alumina, magnesia and/or boria, having a particle size of about 50–400 mesh. The catalyst is maintained in separate cracking and regenerating vessels in a dense turbulent fluidized state resembling a boiling liquid, by gaseous media passing upwardly through the beds at linear superficial velocities of about 0.3–5 feet per second. The catalyst circulates continuously between the reactor and regenerator, heat for cracking being generated by burning carbon from the catalyst in the regenerator. Conventional conditions include cracking temperatures of about 800°–1000° F., regeneration temperatures of about 950°–1200° F. and pressures of from subatmospheric to about 150 pounds per square inch gauge.

In conventional operation, the average catalyst life is usually limited to about 50–100 days as the result of deactivation by iron which can not be overcome by combustion-type regeneration. When employing the present invention, catalyst life may be extended up to 2–3 fold by an efficient and economical removal of iron carried by the oil feed.

The system illustrated by the drawing permits of various modifications. Other means for emulsifying water with the oil feed may be used in place of mixing valve 5. For example, a series of mixing orifices, or jet-type mixers can be used; or mechanical means such as propellers, paddles or pumps may be employed.

A small proportion, say up to about 1–10 parts per 100,000 parts oil of a suitable demulsifying agent, such as a commercially available petroleum sulfonate base demulsifier, may be added via line 41 to the oil-water mixture in line 7 to aid in the subsequent separation of the emulsion from the bulk of clean oil in settler 10. For similar purposes, the original water-in-oil emulsion may be first treated in an emulsion breaker, such as an electrical precipitator, packed filter bed, etc., schematically illustrated by element 43. Conditions in element 43 should be so controlled as to accomplish a preliminary separation of an unbroken emulsion from the bulk of the oil without seriously impairing the overall removal of contaminants. Means suitable for this purpose may include a high voltage field, centrifugal action, coalescing over high surface area packings or beds, etc.

Settler 10 itself may be modified by incorporating therein or combining therewith percolation through filters or packed beds; centrifuging; electrical precipitation; or any other suitable means for increasing the efficiency of the separation of the emulsion from the clean oil. However, all these auxiliary means, if applied at all, must be so operated that breaking of the emulsion in contact with the bulk of clean oil is avoided.

As previously indicated, the emulsion separated as a whole from the clean oil by settling or the like, represents a small amount of liquid. It may, therefore, be practical in many cases directly to filter or distil this emulsion as a whole in suitable equipment to produce therefrom an additional small amount of clean oil in a single step. For similar reasons, distillation column 35 may sometimes be effectively replaced by filtering equipment suitable to remove the finely divided solids contained in the oil.

Regarding the catalytic cracking stage, the invention is not limited to fluid operation although the invention affords greatest advantages in combination with this type of catalytic cracking because of the specific sensitivity of fluid catalysts to deactivation by iron. Other systems, such as fixed bed, moving bed, or suspensoid-type of catalytic cracking operations may be used.

While the invention has been described with particular reference to the decontamination of catalytic cracking feed stocks, such as gas oils, there is a variety of other highly useful applications of the invention. It can be used, quite generally, for separating or recovering particles or compounds which are insoluble in oil and water. For example, it offers a means for removing dirt and particles from lubricating and cutting oils, or oils for oil burners, etc., or for specialty products, such as wax making or chemicals manufacture.

Other modifications of the invention falling within its scope will appear to those skilled in the art.

What is claimed is:

1. The process of catalytically cracking a petroleum hydrocarbon oil of the gas oil boiling range, said oil originally containing water-insoluble and oil-insoluble iron-containing contaminants, which consists essentially of intimately mixing said oil with about 5 to about 10 percent of its volume of water, thereby forming a mixture of free oil and water-in-oil emulsion, subjecting said mixture to gravity settling for a period of from about 5 to 100 hours whereby there are formed a minor layer of unbroken emulsion and a major layer of free oil, said free oil being substantially free of said contaminants, and said emulsion containing about 2 to 10 volume percent of said oil and substantially all of said contaminants, separating said unbroken emulsion layer as a whole from said free oil layer and subjecting said free oil to catalytic cracking.

2. The process defined by claim 1 including the additional steps of breaking said separated emulsion, recovering therefrom additional free oil containing a portion of said contaminants, removing said contaminants from said additional free oil and combining said additional free oil with said oil subjected to catalytic cracking.

3. The process defined by claim 2 wherein removal of contaminants from said additional free oil is effected by distilling said additional free oil.

4. The process defined by claim 2 wherein removal of contaminants from said additional free oil is effected by filtration.

References Cited in the file of this patent

UNITED STATES PATENTS

| | | |
|---|---|---|
| 1,373,773 | Sharples | Apr. 5, 1921 |
| 1,901,228 | Davis et al. | Mar. 14, 1933 |
| 2,273,915 | Wellman | Feb. 24, 1942 |
| 2,314,257 | Vaughan et al. | Mar. 16, 1943 |
| 2,366,792 | Kirkbride | Jan. 9, 1945 |
| 2,421,968 | Schutte | June 10, 1947 |
| 2,425,532 | Hemminger | Aug. 12, 1947 |

OTHER REFERENCES

"Removal of Inorganic Salts from Crude Petroleum" by Hawthorne et al., Refiner and Natural Gasoline Manufacturer: vol. 17, No. 6, June 1938, pages 261 to 270.

"Desalting Crude Petroleum" by Christianson et al., Bureau of Mines, R.1 3422; October 1938; pages 9 and 10.

"Asphalts and Allied Substances" fifth edition; volume one, page 378; January 1945.